July 7, 1953 — C. HARDEN — 2,644,393

JUICE SEPARATOR

Filed Nov. 17, 1951 — 2 Sheets-Sheet 1

CARL HARDEN,
INVENTOR.

BY Lyon & Lyon
ATTORNEYS

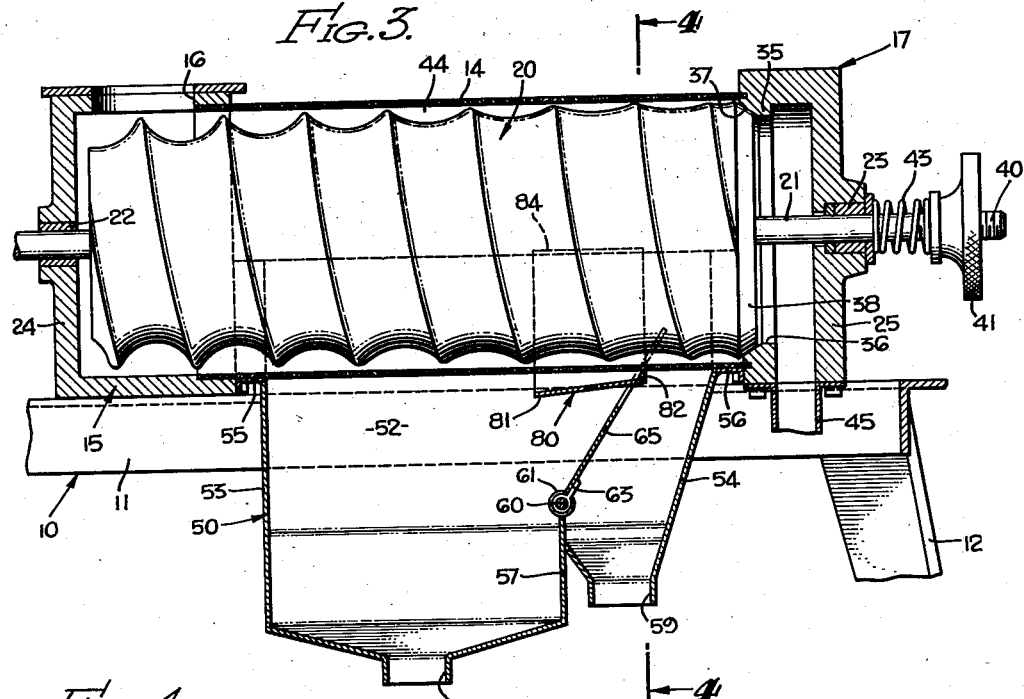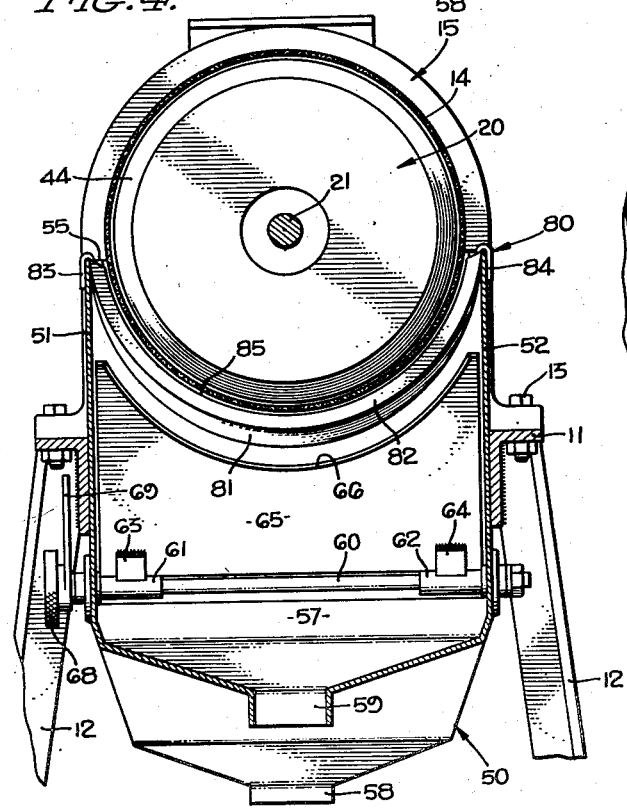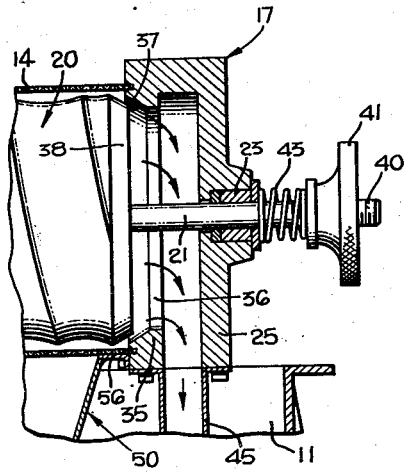

Patented July 7, 1953

2,644,393

UNITED STATES PATENT OFFICE 2,644,393

JUICE SEPARATOR

Carl Harden, Whittier, Calif., assignor to Brown Citrus Machinery Corporation, Whittier, Calif., a corporation of California Application November 17, 1951, Serial No. 256,906

5 Claims. (Cl. 100—105)

This invention relates to the fruit juice processing art and has particular reference to improved apparatus for separating pulp, seeds and other solid or semi-solid matter from raw juice.

Citrus juice separators or finishers presently in commercial use comprise apparatus in which the raw citrus juice, containing a substantial amount of pulp, seeds, bits of peel and other foreign particles, is forced against a suitable screen or screens, the clear juice passing through the screens and the pulp and other foreign matter remaining behind where it is collected and disposed of as waste. Pressure means are provided so that a portion of the juice remaining with the pulp also may be forced through the screens. It has been found that such devices cannot be operated with a high degree of efficiency, since, if sufficient pressure is exerted to force substantially all of the juice through the screens, a relatively high portion of pulp and pulp fluid also is passed therethrough. A finished juice having a relatively high pulp content is not satisfactory for use for canning since the pulp and pulp fluids contain pectin which, if present in even comparatively small amounts, causes jelling of the canned product. This is especially true in the preparation of frozen concentrated orange juice, where no pasteurization is performed to inactivate the enzymes which act upon the pectin to cause jelling. Consequently, the present practice is to stop the separation process at a point short of maximum juice recovery to avoid excessive pulp content. The pulp leaving the finishers is therefore rich in juice which must be wasted.

Accordingly, one of the principal objects of this invention is to provide an improved citrus juice separator or finisher apparatus provided with means for a fine adjustment and control over the pulp content of citrus juices finished thereby.

Another object of this invention is to provide a finisher apparatus for citrus juices which is capable of operation at high efficiencies in terms of gallons of usable juice product per gallon of raw juice input.

Another object of this invention is to provide a citrus juice finisher in which substantially all of the juice is expelled from the pulp, the finisher being provided with means for separating relatively pulp-free juice from juice of excessively high pulp content.

A further object of this invention is to provide a novel juice collector pan for a screw-type citrus juice finisher, the pan having a double output reservoir with a swingable partition or baffle member being provided to divert the finished juice into the appropriate reservoir section.

Yet another object of this invention is to provide a novel juice cut-off member for cooperation with a screw-type citrus juice finisher, the cut-off member being adjustable to vary the pulp content of the finished juice.

Other objects and advantages of this invention, it is believed, will be readily apparent from the following detailed designation of a preferred embodiment thereof when read in connection with the accompanying drawings, in which:

Figure 3 is a sectional elevation taken substantially on the line 3—3 of Figure 1.

Figure 4 is a sectional elevation taken substantially on the line 4—4 of Figure 3.

Figure 5 is a fragmentary view similar to Figure 3, but illustrating a relief valve in partially open position.

Figure 1:
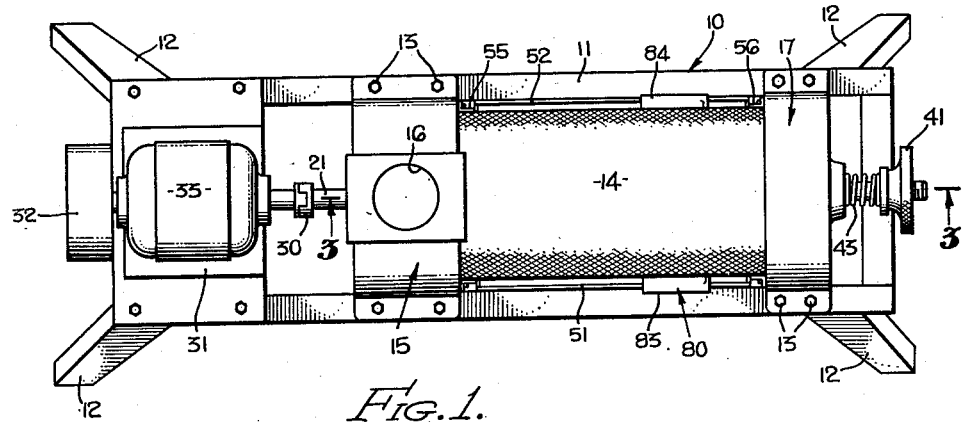
Figure 1 is a top plan view of a citrus juice finisher device embodying the invention.
Figure 2:
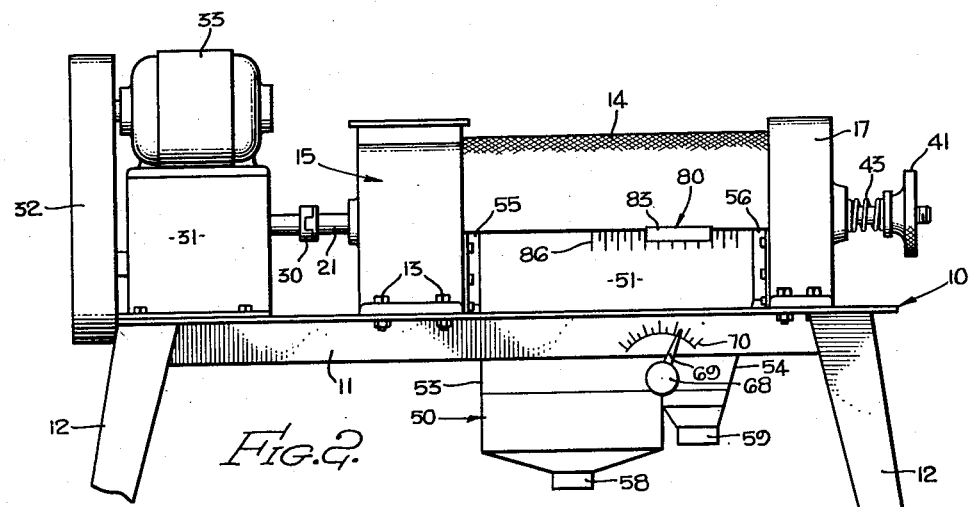
Figure 2 is a side elevation of the device.

Referring now to the drawings, a conventional screw-type citrus juice separator or finisher device, modified in accordance with a preferred embodiment of this invention, is indicated generally at 10. This conventional device includes a table member 11 supported on legs 12. Secured to the top of the table 11 by means of the bolts 13 is the finisher unit which includes a generally horizontal cylindrical screen 14 connected at one end to an inlet housing 15 having an inlet port 16 and at the other end to an outlet housing 17. Mounted for rotation within the screen 14 is a screw member 20 which has a constant helix angle but a root diameter which increases constantly in a direction toward the outlet housing 17. It thus will be understood that the clearance between the screw member 20 and the screen 14 decreases progressively in a direction toward the outlet housing 17.

The screw member 20 is keyed to a shaft 21 which is journaled in suitable bearings 22 and 23 in the end walls 24 and 25, respectively, of the inlet and outlet housings. The shaft 21 is connected by means of a coupling 30 to the output shaft of a gear box 31 which is connected through a suitable transmission 32 to the power source or motor 33. The forward wall 35 of the outlet housing is provided with an enlarged central opening 36 and forming a continuation of this opening is a tapered valve seat 37. The end of the screw member 20 adjacent the outlet housing is provided with a tapered valve member 38. Means are provided for opening and closing the relief valve formed by the valve member 38 and tapered seat 37. As shown best in Figure 1, the screw member 20 and shaft 21 are mounted for axial movement, the free end of the shaft 21 extending outwardly from the end wall 25 and being provided with a threaded portion 40. A hand wheel 41 is threadedly engaged with the threaded portion 40 of the shaft and disposed between the hand wheel and the end wall 25 is a compression spring 43. It will be thus understood that the hand wheel 41 may be manipulated to adjust the position of the valve member 38 with respect to the valve seat 37. The apparatus described thus far is conventional and of itself forms no part of this invention, but it has been described somewhat in detail in order that the invention may be fully understood.

In the operation of the device thus described, raw citrus juice is fed into the finisher unit through the inlet port 16 and is forced longitudinally through the clearance space 44 between the screw member 20 and the screen 14. Centrifugal forces set up by the rotation of the screw member 20 throw the clear juice through the screen, while pulp, seeds and other foreign particles are retained within the interior of the screen. As these particles are carried along by the screw member, the progressively increasing root diameter causes increasing pressure to be exerted between the screw member and the screen, thereby squeezing out additional juice which escapes through the screen. The pulp and other foreign matter is eventually carried the entire length of the screw member and is forced through the opening between the valve member 38 and valve seat 37.

The degree of removal of juice from the pulp is controlled by means of the hand wheel 41 which, in turn, controls the tension in the spring 43. If relatively great spring pressure is exerted upon the valve seat 37 a correspondingly greater pressure of the helical screw member 20 is required to press pulp through the relief valve. Such higher pressure also forces a greater amount of juice through the screen perforations and results in the discharge of a drier pulp. The pulp which is forced through the relief valve discharges from the housing 25 through the outlet conduit 45.

It has been found that with apparatus of the general character described the efficiency in terms of gallons of clear juice extracted per gallon of raw juice is somewhat low since processors, in order to avoid forcing an excessive amount of finely divided pectin-containing pulp through the screen, utilize a relatively low pressure, and the pulp leaving the finishers is relatively wet.

In accordance with this invention, means have been provided whereby the juice forced through the screen may be separated into two portions, one relatively clear and containing substantially no pulp and pectin, and the other containing a substantial amount of finely divided pulp. As shown in the drawings, these means include a juice collection pan generally indicated 50. The pan side walls 51 and 52 extend upwardly to encompass the lower portion of the screen 14, sufficient clearance being provided between the walls and the screen, as shown in Figure 1, to assure drainage of juice into the pan.

The pan end walls 53 and 54 are provided with arcuate flanges 55 and 56 contacting the screen and secured to the inlet and outlet housings, respectively. The pan 50 is divided into two portions by means of a transverse wall 57. Outlet drains 58 and 59 are provided for the two pan portions. Journaled in the side walls 51 and 52 and extending therebetween is a shaft member 60 which is positioned immediately above the end wall 57 and provided with sleeve members 61 and 62 carrying tab portions 63 and 64 respectively. Secured to the tab portions as by welding is a baffle plate 65, the upper portion of which is provided with a curved end 66 concentric with the screen 14. Means are provided for pivoting the baffle plate with respect to the wall 57, and as shown best in Figure 4, these means include the hand wheel 68 which is keyed to the shaft member 60. The wheel 68 is provided with an indicator finger 69 which cooperates with a graduated scale 70 on the table 11 to indicate the position of the baffle plate relative thereto.

Figure 6:
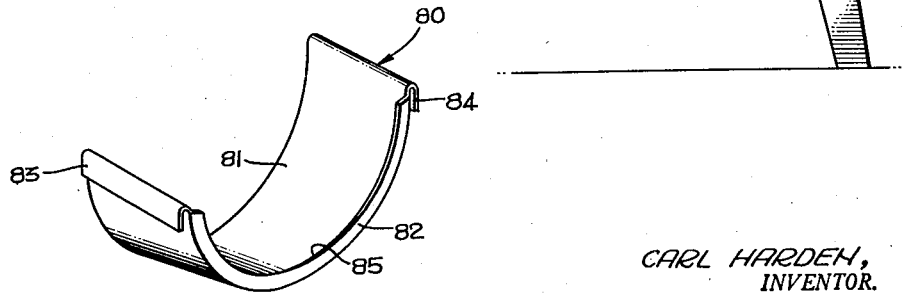
Figure 6 is a perspective view of the finished juice cut-off member.

Slidably mounted with respect to the screen 14 is a juice cut-off device generally indicated 80. As shown in Figure 6, this device comprises a band or sheet 81 curved to form a portion of a truncated cone, the forward end thereof being provided with an upturned flange 82. The lateral edges of the band 81 are turned downwardly to provide flanges 83 and 84, which rest upon the walls 51 and 52, respectively, maintaining the device 80 in place upon the pan 50.

Referring to Figures 3 and 4, it will be understood that the upper edge 85 of the flange 82 is concentric with the screen 14 and formed on a radius such that there is only slight clearance between the flange and the screen. A graduated scale 86 is provided along the upper portion of the side wall 51 so that the position of the device 80 may be indicated.

In operation the finisher relief valve is set tightly so that the screw member 20 must exert a high pressure upon the pulp to eject it from the finisher through the valve opening. The setting of the valve is such that virtually all of the free juice is extracted from the pulp and the pulp discharged through the conduit 45 is relatively dry. This relatively high operating pressure also promotes the forcing of considerable amounts of finely divided pulp through the screen perforations. In order to avoid excessive contamination of the juice which is to be used for frozen concentrate, the device 80 is moved to the point where the quality of the juice coming through the screen is fully acceptable, and the swinging baffle plate 65 is pivoted to a position where it cooperates with the device 80 in delivering clear juice to the portion of the pan 50 containing the outlet 58. Juice coming through the screen on the other side of the device 80 and flange 82 is not acceptable for canning or concentrate and is permitted to fall beyond the baffle and into that portion of the pan 50 reserved therefor from which it is piped away through the outlet 59. This juice is not wasted, however, and may be used for pectin production, as a beverage base, or in cattle feed. It may also be blended back into whole juice going into a pasteurized product.

It will be understood that the device may be successfully operated without the use of the cut-off device 80 in cases where the cut-off point is approximately directly above the axis of the shaft member 60, since here the baffle plate 65 is maintained in a substantially vertical position, only slight clearance resulting between the periphery of the screen 14 and the curved end 66 of the baffle plate. However, when the baffle plate is swung to a position substantially away from the vertical, as shown in Figure 3, the clearance between the end of the baffle plate and the screen 14 periphery is excessive, and unacceptable juice from the rearward side of the screen tends to splash into the forward pan portion so that the desired fine degree of separation between acceptable and non-acceptable juice is not obtained. Accordingly, the juice cut-off device 80 is necessary to avoid contamination of the clear juice, and provides means for exact location of the cut-off point. Similarly, the swinging baffle plate is not essential in all cases since in some pan designs the wall 57 may be extended upwardly to a point where it is just cleared by the device 80, and the baffle plate may then be entirely eliminated.

It will be understood that this invention is not limited for use in combination with the specific separator device described above. For example, in some conventional finisher devices, the screw shaft is not arranged for axial movement and the valve member is not connected to the screw member but is independently axially movable with respect to the shaft, resulting in essentially the same general mode of operation as described above.

While I have shown and described a specific embodiment of my invention, I do not limit myself to the exact details of the construction set forth, and the invention embraces such changes, modifications and equivalents of the parts and their formation and arrangement as come within the purview of the appended claims.

I claim:

1. In combination with a citrus juice finisher of the type having a feed screw and a screen surrounding said screw, a juice collecting pan mounted below said screen, said pan having a pair of spaced outlet openings, a baffle plate pivotally secured to said pan, and a juice cut-off device slidably mounted under said screen and having an arcuate portion closely adjacent said screen and concentric therewith, said device and said baffle cooperating with said screen for selectively diverting citrus juice therefrom into said outlet openings.

2. In combination with a citrus juice finisher of the type having a feed screw and a cylindrical screen surrounding said screw; bottom, end, and side walls forming a juice collecting pan mounted below said screen with said side walls extending upwardly to enclose the lower portion of said screen, said pan having a pair of spaced outlet openings; a baffle plate pivotally secured to said pan; and a juice cut-off device slidably mounted on said side walls and under said screen, said device having an arcuate portion closely adjacent said screen and concentric therewith, said device and said baffle cooperating with said screen for selectively diverting citrus juice therefrom into said outlet openings.

3. In combination with a citrus juice finisher of the type having a feed screw and a screen surrounding said screw; a juice collecting pan mounted below said screen, said pan having a pair of spaced outlet openings; a baffle plate pivotally secured to said pan, and a juice cut-off device slidably mounted under said screen, said device having a downwardly inclined drainage portion; and an upstanding arcuate flange closely adjacent said screen and concentric therewith, said device and said baffle cooperating with said screen for selectively diverting citrus juice therefrom into said outlet openings.

4. In combination with a citrus juice finisher of the type having a feed screw and a screen surrounding said screw; a juice collecting pan mounted below said screen; a transverse wall dividing said pan into two portions; a transverse baffle plate pivotally secured to the pan adjacent the upper portion of said wall; and a juice cut-off device slidably mounted under said screen, said device having a downwardly inclined drainage portion, and an upstanding arcuate flange closely adjacent said screen and concentric therewith, said device and said baffle cooperating with said screen for selectively diverting citrus juice therefrom into said pan portions.

5. In combination with a citrus juice finisher of the type having a feed screw and a screen surrounding said screw; bottom, end, and side walls forming a juice collecting pan mounted below said screen with said side walls enclosing the lower portion of said screen and spaced therefrom; a transverse wall dividing said pan into two portions, an a tansverse baffle plate pivotally secured to the pan adjacent the upper portion of said wall; and a juice cut-off device slidably mounted on said side walls and under said screen, said device having a downwardly inclined drainage portion, and a transverse, upstanding flange closely adjacent said screen and concentric therewith, said device and said baffle cooperating with said screen for selectively diverting citrus juice therefrom into said pan portions.

CARL HARDEN.

References Cited in the file of this patent

UNITED STATES PATENTS

| Number | Name | Date |
|---|---|---|
| 1,621,022 | Merchen | Mar. 15, 1927 |
| 1,971,546 | Tuttle | Aug. 28, 1934 |
| 2,048,791 | Gilliatt | July 28, 1936 |

FOREIGN PATENTS

| Number | Country | Date |
|---|---|---|
| 365,686 | France | July 4, 1906 |